Patented July 11, 1939

2,165,940

UNITED STATES PATENT OFFICE 2,165,940

PROCESS FOR IMPROVING FUEL OIL

Mathias Pier, Heidelberg, and Ernst Donath, Mannheim, Germany, assignors to Standard-I. G. Company, Linden, N. J., a corporation of Delaware No Drawing. Application December 24, 1937, Serial No. 181,700. In Germany December 28, 1936

6 Claims. (Cl. 196—53)

The present invention relates to a process for improving fuel oils by treating them with hydrogenating gases.

Many oils which, when freshly prepared, are good fuel oils suffer from the disadvantage that, when stocked for some time, form deposits which clog and choke up pipes, conduits, valves and nozzles through which the oils pass which renders the oils difficult to pump.

We have now found that oils of comparatively poor quality for fuel oil purposes are converted into good fuel oils which are stable when stocked by enriching their hydrogen content by a small amount usually below 1 per cent preferably below 0.5 per cent by weight, by hydrogenation with a hydrogenating gas, namely hydrogen or gases containing sufficient free hydrogen, at elevated temperature and under elevated pressure in the presence of a large proportion of a hydrogenation catalyst.

It is already known to treat oils of high boiling range with hydrogenating gases at elevated temperatures and under pressure in order to convert them into gasoline and/or middle oil or in order to free them of asphaltic constituents. This type of treatment has, however, always been carried out under such conditions that considerable amounts of hydrogen entered into combination with the oils.

In contrast to these known processes, very small amounts of hydrogen combine with the oils in accordance with the present invention, which is based upon the new insight that only a small proportion of the constituents which, according to the oil processes, were completely converted, is the cause of the aforesaid disadvantages. The enrichment of the oils by the small amounts of hydrogen herein specified suffices to transform them into very stable fuel oils, since only the objectionable constituents are converted, whereas a large proportion of other constituents of the type of asphalts and the like remains unaltered.

Finely divided catalysts may be dispersed in a high concentration in the initial materials, but it is more advantageous to work with large amounts of catalyst stationarily contained in the reaction space. When the catalysts are dispersed in the initial material, they may, for example, be employed in amounts of 10, 15, 20 per cent or more by weight.

Catalysts useful in destructive hydrogenation are employed for the process in accordance with the present invention, for example, the metals useful in destructive hydrogenation of groups 5, 6, 7 and 8 of the periodic table and compounds of said metals, more particularly the sulphides, oxides or hydroxides, for example of chromium, vanadium, tungsten or molybdenum, iron or cobalt, either alone or in admixture with each other or with other substances. If desired, halogens or hydrogen halides or substances supplying the same under the working conditions, such as carbon tetrachloride or an ammonium halide, or also halides of metals such as aluminum chloride, bromide or iodide may simultaneously be used. Tin and zinc, more particularly organic compounds thereof such as tin salts of lower organic acids, for example of formic, acetic or oxalic acid, are also good catalysts for the said purpose. The catalysts may be supported by carriers, for example, brown coal small coke which may, if so desired, be preactivated by treatment with steam and/or acids such as sulphuric acid; other carriers, for example, bleaching earths, such as bentonite, Terrana, silica gel or clay may likewise be employed, if desired after a pretreatment with fluorine or compounds of fluorine capable of corroding silicates.

In order to obtain the desired limited hydrogenation the various working conditions must be carefully correlated and adapted to each other and to the initial oil. By the use of a large proportion of catalysts it is easy to direct the hydrogenation in such a manner that only the desired small amount of hydrogen is added to the oils. Simple preliminary tests allow of easily determining the exact temperatures, pressures and throughputs to be used with a given initial material and catalyst.

The working temperature usually is between 280 and 550° C., preferably between about 300° and 450° C. For example, with a throughput of about 1 kilogram per hour and per litre reaction space the temperatures are between about 340° and 400° C., if tungsten disulphide is used as the catalyst. In case molybdenum disulphide is employed the temperatures are generally speaking only slightly higher, the same being true if a larger throughput is employed. It is also possible to select temperatures gradually increasing as the reaction proceeds. The pressure to be used is generally speaking dependent upon the proportions of hydrogen and asphalt contained in the initial oil and the average molecular weight thereof. Higher pressures will be employed when the proportion of hydrogen is low and the content of asphalt and the molecular weight are high; for example, pressures of at least 50 atmospheres, say 100 up to 1000 atmospheres or more, preferably between 200 and 600 atmospheres may be used.

In order to effect the desired limited addition of hydrogen a comparative high throughput is made use of. According to the amount of resins, asphalts and like impurities contained in the initial oil, throughputs of 0.3, 0.5 up to 1 kilogram or more per litre of reaction space and hour will be employed.

Initial materials which are converted into good fuel oils in accordance with the process of the present invention, comprise, for example, oils which are obtained by thermal treatments from solid, semi-solid, fusible or liquid carbonaceous materials, such as various sorts of coal, including bituminous coal and brown coal, tars, shale oils or mineral oils by distillation, by extraction under pressure, by low temperature carbonization or by thermal treatments under pressure in the presence of hydrogenating gases, for example, by destructive hydrogenation.

The extraction under pressure may be carried out in the presence of limited amounts of hydrogen or in the absence of hydrogen, if desired with the aid of agents capable of transferring hydrogen to the extraction products. For example, the extraction may be carried out by means of middle oils of cyclic nature such as middle oils obtained by destructive hydrogenation or distillation of solid carbonaceous materials, which middle oils may contain or be admixed with phenols, for example cresols. Hydroaromatic hydrocarbons, for example tetrahydronaphthalene, which act as transferrers of hydrogen may be admixed to said middle oils or they may be employed alone, or in admixture with aromatic hydrocarbons such as naphthalene as extraction means.

In case the extraction is carried out in the absence of hydrogen and/or of transferrers of hydrogen, the extraction products usually contain so little hydrogen that their content of hydrogen must be enriched by from 1 to 2 per cent by weight in order to have stable fuel oils. The smallest amount of hydrogen to be added usually is 0.1 per cent by weight.

The crude fuel oils may be subjected, if desired or necessary, to centrifuging or filtering, before they are hydrogenated in accordance with the present invention, in order to mechanically eliminate solid constituents, such as dust and ash. This treatment is preferably carried out in the presence of filter aids, for example, porous solid substances, such as bleaching earth.

If the initial oils contain large amounts of hard asphalt, for example, more than 20 per cent by weight, it is advisable to carry out the hydrogenation at pressures above 500 atmospheres and/or to add a cyclic hydrocarbon diluent such as middle oils obtained from bituminous coal by distillation, extraction or destructive hydrogenation, or like oils of cyclic nature, for instance tetrahydronaphthalene, decahydronaphthalene or mixtures thereof.

If the initial oils contain substances which are very readily polymerized, it is preferable to remove these substances before the hydrogenation in accordance with the present invention, by means of adsorbent substances or, alternatively, to subject the initial oil to a preliminary catalytic hydrogenation at comparatively low temperatures, such as, for example, from 200° to 350° C.

The following example will further illustrate how the present invention may be carried out in practice, but it should be understood that the invention is not limited to the said example. The parts and percentages are by weight, unless otherwise stated.

Example

Bituminous coal is subjected to destructive hydrogenation with a high throughput at 460° centigrade under a pressure of 250 atmospheres with the addition of 0.06 per cent of tin in the form of a suitable compound and 0.8 per cent of ammonium chloride. The gasoline (about 15 per cent of the oil) is removed by distillation from the resulting oil and the residue which consists of middle oil and heavy oil is filtered. The filtered oil is subjected to hydrogenation at temperatures increasing from 355° to 390° C. under a pressure of 300 atmospheres with a throughput of 0.6 kilogram of oil per liter of reaction space an hour in a converter charged with sulphide of tungsten. The hydrogen content of the oil is thus increased by 0.42 per cent whereby the oil is converted into a fuel oil of excellent quality which is very stable when stocked. Whereas when air is passed at 80° C. for two hours through the initial oil this is altered in such a manner that the oil chokes up the valves of the circulating pumps, so that soon the pumps do not work any more, the hydrogenated oil does not show any inconvenience of this kind neither when subjected to the same test nor even after a long period of storage.

A similar good fuel oil is obtained by hydrogenating the same crude oil at a temperature rising up to 405° C. under a pressure of 600 atmospheres with a throughput of 1 kilogram per hour and per liter of reaction space.

What we claim is:

1. A process for the improvement of fuel oils of poor quality which comprises treating them with a hydrogenating gas in the presence of a large proportion of a hydrogenation catalyst while correlating and adapting to each other and to the initial material the temperature, the pressure and the throughput in such a manner that the hydrogen content of the initial oil is enriched by an amount of between 0.1 and 1 per cent.

2. In the process claimed in claim 1 correlating and adapting to each other and to the initial material the said working conditions in such a manner that the hydrogen content of the initial oil is enriched by an amount of between 0.1 and 0.5 per cent.

3. The process as claimed in claim 1 using a large proportion of a hydrogenation catalyst stationarily contained in the reaction space.

4. The process as claimed in claim 1 which comprises treating with hydrogenating gases an initial material containing large amounts of hard asphalt while adding a cyclic hydrocarbon diluent.

5. The process as claimed in claim 1 which comprises treating with hydrogenating gases an initial material containing large amounts of hard asphalt while employing a pressure above 500 atmospheres.

6. The process as claimed in claim 1 which comprises treating with hydrogenating gases an initial material containing large amounts of hard asphalt while adding a cyclic hydrocarbon diluent and employing a pressure above 500 atmospheres.

MATHIAS PIER.
ERNST DONATH.